US011850525B2

(12) United States Patent
Mix

(10) Patent No.: US 11,850,525 B2
(45) Date of Patent: *Dec. 26, 2023

(54) METHODS AND SYSTEMS FOR MANAGING A FANTASY SPORTS LEAGUE

(71) Applicant: Fanus, LLC, Lakewood, OH (US)

(72) Inventor: Allen Mix, Lakewood, OH (US)

(73) Assignee: Fanus, LLC, Lakewood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,536

(22) Filed: Mar. 8, 2022

(65) Prior Publication Data

US 2022/0184507 A1     Jun. 16, 2022

Related U.S. Application Data

(63) Continuation of application No. 16/874,780, filed on May 15, 2020, now Pat. No. 11,273,382.

(60) Provisional application No. 62/848,175, filed on May 15, 2019.

(51) Int. Cl.
    *A63F 13/828*      (2014.01)
    *A63F 13/46*      (2014.01)

(52) U.S. Cl.
    CPC ............ *A63F 13/828* (2014.09); *A63F 13/46* (2014.09); *A63F 2300/8052* (2013.01)

(58) Field of Classification Search
CPC . A63F 13/46; A63F 13/828; A63F 2300/8052
See application file for complete search history.

(56) References Cited

U.S. PATENT DOCUMENTS

| | | |
|---|---|---|
| 6,371,855 B1 | 4/2002 | Gavriloff |
| 7,699,707 B2 | 4/2010 | Bahou |
| 7,922,570 B2 | 4/2011 | Del Prado |
| 8,403,756 B2 | 3/2013 | Baray |
| 8,509,929 B1 | 8/2013 | Hughes |
| 8,622,797 B2 | 1/2014 | Noonan |
| 9,498,726 B2 | 11/2016 | Wolgin |
| 9,849,381 B2 | 12/2017 | Hood |
| 10,159,893 B2 | 12/2018 | Gotkin |
| 10,737,182 B2 | 8/2020 | Martin |
| 10,967,281 B2 | 4/2021 | Lazarus |
| 11,273,382 B2 | 3/2022 | Mix |
| 2003/0054885 A1 | 3/2003 | Pinto |
| 2004/0110552 A1 | 6/2004 | Del Prado |
| 2004/0266530 A1 | 12/2004 | Bishop |
| 2005/0159220 A1 | 7/2005 | Wilson |

(Continued)

FOREIGN PATENT DOCUMENTS

WO    WO-2016191860 A1 * 12/2016 ............. A63F 13/00

OTHER PUBLICATIONS

International Search Report and Written Opinion from PCT/US2020/033072 dated Jul. 7, 2020.

*Primary Examiner* — Steven J Hylinski
(74) *Attorney, Agent, or Firm* — Calfee, Halter & Griswold LLP

(57) ABSTRACT

Methods and systems of managing a fantasy sports league, and more particularly, a fantasy sports league that can utilize initial and current team values associated with each real sports team for determining which teams are allowed on a participant's roster and for determining each participant's accumulated points total during a league season.

20 Claims, 11 Drawing Sheets

(56) References Cited

U.S. PATENT DOCUMENTS

| | | | |
|---|---|---|---|
| 2006/0217198 A1* | 9/2006 | Johnson | A63F 13/12 463/40 |
| 2006/0252476 A1* | 11/2006 | Bahou | G06Q 10/10 463/4 |
| 2007/0054718 A1* | 3/2007 | Del Prado | A63F 13/792 463/1 |
| 2008/0096664 A1* | 4/2008 | Baray | A63F 13/85 463/42 |
| 2008/0125228 A1 | 5/2008 | Ware | |
| 2011/0028195 A1 | 2/2011 | Pennington | |
| 2011/0034225 A1* | 2/2011 | Butz, Jr. | A63F 13/65 463/43 |
| 2011/0237317 A1* | 9/2011 | Noonan | A63F 13/828 463/2 |
| 2013/0013092 A1 | 1/2013 | Lang | |
| 2013/0079073 A1 | 3/2013 | Sharifi | |
| 2013/0079130 A1 | 3/2013 | Takacs | |
| 2013/0260898 A1* | 10/2013 | Pepe | A63F 13/335 463/42 |
| 2013/0303268 A1 | 11/2013 | Miller | |
| 2014/0274245 A1* | 9/2014 | Stickel | A63F 13/65 463/9 |
| 2015/0224406 A1* | 8/2015 | Wolgin | A63F 13/792 463/9 |
| 2015/0231507 A1 | 8/2015 | Vu | |
| 2015/0273345 A1* | 10/2015 | Ford | A63F 13/828 463/31 |
| 2016/0051895 A1* | 2/2016 | Hood | A63F 13/35 463/29 |
| 2016/0067606 A1* | 3/2016 | Fernandez | A63F 13/795 463/31 |
| 2016/0296843 A1* | 10/2016 | Stickel | A63F 13/46 |
| 2017/0001120 A1 | 1/2017 | Mueller | |
| 2017/0036120 A1* | 2/2017 | Knittel | A63F 13/828 |
| 2017/0165581 A1* | 6/2017 | McAuley | A63F 13/32 |
| 2017/0165582 A1 | 6/2017 | Kim | |
| 2018/0280811 A1* | 10/2018 | Martin | A63F 13/828 |
| 2018/0345151 A1 | 12/2018 | Arnone | |
| 2019/0143224 A1 | 5/2019 | Melissinos | |
| 2020/0023278 A1* | 1/2020 | Perkin | A63F 13/46 |

* cited by examiner

| | | | Projected Wins | |
|---|---|---|---|---|
| A | | 1 Astros | 100 | |
| | | 2 Indians | 97 | |
| | | 3 Dodgers | 96 | $5 |
| | | 4 Nationals | 93 | |
| | | 5 Yankees | 92 | |
| | | 6 Cubs | 91 | |
| B | | 7 Red Sox | 90 | |
| | | 8 Angels | 87 | |
| | | 9 Twins | 86 | $4 |
| | | 10 Brewers | 86 | |
| | | 11 Rockies | 85 | |
| | | 12 Cardinals | 85 | |
| C | | 13 Diamondbacks | 84 | |
| | | 14 Mets | 83 | |
| | | 15 Gaints | 82 | $3 |
| | | 16 Mariners | 81 | |
| | | 17 Rangers | 80 | |
| | | 18 Blue Jays | 79 | |
| D | | 19 Rays | 77 | |
| | | 20 Braves | 76 | |
| | | 21 Phillies | 75 | $2 |
| | | 22 Athletics | 74 | |
| | | 23 White Sox | 73 | |
| | | 24 Royals | 72 | |
| E | | 25 Orioles | 71 | |
| | | 26 Pirates | 70 | |
| | | 27 Padres | 70 | $1 |
| | | 28 Reds | 69 | |
| | | 29 Tigers | 65 | |
| | | 30 Marlins | 60 | |
| | Total Salary Cap: | | | $15 |

Fig. 3

| Team | Win | Loss | Road Wins | Point For | Points Against | Exp W |
|---|---|---|---|---|---|---|
| Cincinnati | 6 | 0 | 3 | 230 | 82 | 11.04 |
| East Carolina | 2 | 4 | 0 | 140 | 193 | 3.82 |
| Houston | 5 | 1 | 2 | 292 | 168 | 9.45 |
| Memphis | 4 | 3 | 0 | 307 | 178 | 9.41 |
| Navy | 2 | 4 | 0 | 168 | 191 | 5.09 |
| SMU | 2 | 4 | 0 | 169 | 238 | 3.69 |
| Temple | 4 | 3 | 2 | 220 | 154 | 8.40 |
| Tulsa | 1 | 5 | 0 | 146 | 181 | 4.50 |
| Tulane | 2 | 4 | 0 | 150 | 181 | 4.69 |
| UCF | 6 | 0 | 2 | 274 | 117 | 10.59 |
| Uconn | 1 | 5 | 0 | 122 | 322 | 1.09 |
| USF | 6 | 0 | 2 | 211 | 150 | 8.30 |
| Boston College | 5 | 2 | 1 | 277 | 182 | 8.76 |
| Clemson | 6 | 0 | 3 | 253 | 87 | 11.11 |
| Duke | 5 | 1 | 3 | 192 | 106 | 9.64 |
| Florida State | 3 | 3 | 1 | 138 | 151 | 5.36 |
| Georgia Tech | 3 | 4 | 1 | 262 | 198 | 7.92 |
| Louisville | 2 | 5 | 0 | 143 | 234 | 2.85 |
| Miami, FL | 5 | 2 | 1 | 262 | 127 | 10.17 |
| NC State | 5 | 0 | 1 | 165 | 84 | 9.98 |
| North Carolina | 1 | 4 | 0 | 103 | 169 | 2.83 |
| Pittsburgh | 3 | 4 | 0 | 170 | 216 | 4.34 |
| Syracuse | 4 | 2 | 1 | 258 | 151 | 9.37 |
| Virginia | 4 | 2 | 0 | 167 | 115 | 8.49 |
| Virginia Tech | 4 | 2 | 3 | 197 | 147 | 8.00 |
| Wake Forest | 3 | 3 | 1 | 194 | 221 | 5.08 |

900

| Team | Exp Wins |
|---|---|
| Alabama | 11.43 |
| Clemson | 11.11 |
| Fresno State | 11.05 |
| Cincinnati | 11.04 |
| Michigan | 10.74 |
| Mississippi State | 10.72 |
| Ohio State | 10.68 |
| Georgia | 10.66 |
| UCF | 10.59 |
| Utah State | 10.35 |
| Kentucky | 10.27 |
| Penn State | 10.24 |
| Florida | 10.20 |
| Miami, FL | 10.17 |
| NC State | 9.98 |
| Iowa | 9.91 |
| LSU | 9.84 |
| Duke | 9.64 |
| Washington | 9.62 |
| West Virginia | 9.60 |
| Utah | 9.57 |
| Oklahoma | 9.50 |
| Washington State | 9.50 |
| Notre Dame | 9.46 |
| Houston | 9.45 |
| Oregon | 9.43 |
| Army | 9.42 |
| Memphis | 9.41 |
| Syracuse | 9.37 |
| Colorado | 9.34 |
| Auburn | 9.31 |
| Boise State | 9.21 |
| Texas A&M | 8.93 |
| Texas Tech | 8.80 |
| Buffalo | 8.78 |
| Boston College | 8.76 |
| Wisconsin | 8.74 |
| Virginia | 8.49 |

Fig. 9

2018 NCAA FOOTBALL BANDWAGON FANTASY SPORTS EXCHANGE SHEET

| TIER | RANK | TEAM | PROJ W | Exchange Value |
|---|---|---|---|---|
| A | 1 | Alabama | 11.43 | $8 |
| A | 2 | Clemson | 11.11 | |
| A | 3 | Fresno State | 11.05 | |
| A | 4 | Cincinnati | 11.04 | |
| A | 5 | Michigan | 10.74 | |
| A | 6 | Mississippi State | 10.72 | |
| A | 7 | Ohio State | 10.68 | |
| A | 8 | Georgia | 10.66 | |
| A | 9 | UCF | 10.59 | |
| A | 10 | Utah State | 10.35 | |
| A | 11 | Kentucky | 10.27 | |
| A | 12 | Penn State | 10.24 | |
| A | 13 | Florida | 10.20 | |
| B | 14 | Miami, FL | 10.17 | $7 |
| B | 15 | NC State | 9.99 | |
| B | 16 | Iowa | 9.91 | |
| B | 17 | LSU | 9.84 | |
| B | 18 | Duke | 9.64 | |
| B | 19 | Washington | 9.62 | |
| B | 20 | West Virginia | 9.60 | |
| B | 21 | Utah | 9.57 | |
| B | 22 | Oklahoma | 9.52 | |
| B | 23 | Washington State | 9.52 | |
| B | 24 | Notre Dame | 9.46 | |
| B | 25 | Houston | 9.45 | |
| B | 26 | Oregon | 9.43 | |
| C | 27 | Army | 9.47 | $6 |
| C | 28 | Memphis | 9.41 | |
| C | 29 | Syracuse | 9.37 | |
| C | 30 | Colorado | 9.34 | |
| C | 31 | Auburn | 9.31 | |
| C | 32 | Boise State | 9.21 | |
| C | 33 | Texas A&M | 8.93 | |
| C | 34 | Texas Tech | 8.80 | |
| C | 35 | Buffalo | 8.78 | |
| C | 36 | Boston College | 8.76 | |
| C | 37 | Wisconsin | 8.74 | |
| C | 38 | Virginia | 8.49 | |
| C | 39 | Purdue | 8.47 | |
| D | 40 | Temple | 8.40 | $5 |
| D | 41 | TCU | 8.37 | |
| D | 42 | Arizona State | 8.31 | |
| D | 43 | USF | 8.30 | |
| D | 44 | Oklahoma State | 8.22 | |
| D | 45 | Maryland | 8.08 | |
| D | 46 | Virginia Tech | 8.00 | |
| D | 47 | Texas | 7.98 | |
| D | 48 | Air Force | 7.95 | |
| D | 49 | Georgia Tech | 7.92 | |
| D | 50 | Toledo | 7.47 | |
| D | 51 | New Mexico | 7.46 | |
| D | 52 | Ole Miss | 7.13 | |
| E | 53 | Western Michigan | 7.16 | $4 |
| E | 54 | Michigan State | 7.11 | |
| E | 55 | Stanford | 7.08 | |
| E | 56 | Hawaii | 6.91 | |
| E | 57 | Eastern Michigan | 6.81 | |
| E | 58 | Missouri | 6.80 | |
| E | 59 | South Carolina | 6.78 | |
| E | 60 | San Diego State | 6.75 | |
| E | 61 | Iowa State | 6.60 | |
| E | 62 | Ball State | 6.53 | |
| E | 63 | Miami, OH | 6.49 | |
| E | 64 | Baylor | 6.47 | |
| E | 65 | Tennessee | 6.36 | |
| F | 66 | Kansas | 6.31 | $3 |
| F | 67 | Minnesota | 6.28 | |
| F | 68 | BYU | 6.20 | |
| F | 69 | USC | 6.14 | |
| F | 70 | Ohio | 6.07 | |
| F | 71 | Vanderbilt | 5.89 | |
| F | 72 | Northwestern | 5.77 | |
| F | 73 | Arizona | 5.67 | |
| F | 74 | Nevada | 5.56 | |
| F | 75 | Kansas State | 5.50 | |
| F | 76 | Indiana | 5.48 | |
| F | 77 | Liberty | 5.48 | |
| F | 78 | Florida State | 5.35 | |
| G | 79 | Navy | 5.09 | $2 |
| G | 80 | Akron | 5.09 | |
| G | 81 | Wake Forest | 5.08 | |
| G | 82 | California | 4.92 | |
| G | 83 | Tulane | 4.69 | |
| G | 84 | UNLV | 4.64 | |
| G | 85 | Illinois | 4.53 | |
| G | 86 | UMass | 4.52 | |
| G | 87 | Tulsa | 4.50 | |
| G | 88 | Northern Illinois | 4.43 | |
| G | 89 | Pittsburgh | 4.34 | |
| G | 90 | East Carolina | 3.82 | |
| G | 91 | SMU | 3.69 | |
| H | 92 | Arkansas | 3.68 | $1 |
| H | 93 | Colorado State | 3.60 | |
| H | 94 | Central Michigan | 3.50 | |
| H | 95 | UCLA | 3.46 | |
| H | 96 | Oregon State | 3.35 | |
| H | 97 | Kent State | 3.00 | |
| H | 98 | Louisville | 2.85 | |
| H | 99 | North Carolina | 2.83 | |
| H | 100 | Nebraska | 2.83 | |
| H | 101 | Wyoming | 2.76 | |
| H | 102 | Bowling Green | 2.53 | |
| H | 103 | New Mexico State | 2.38 | |
| H | 104 | San Jose State | 2.36 | |
| H | 105 | Rutgers | 1.37 | |
| H | 106 | UConn | 1.09 | |

Fig. 10

METHODS AND SYSTEMS FOR MANAGING A FANTASY SPORTS LEAGUE

CROSS-REFERENCE TO RELATED CASES

This case is a continuation of U.S. patent application Ser. No. 16/874,780, filed on May 15, 2020, (which granted as U.S. Pat. No. 11,273,382 on Mar. 15, 2022), which claims priority to and the benefit of U.S. Provisional Application Ser. No. 62/848,175, filed on May 15, 2019, the entire disclosure of which are hereby incorporated by reference in their entireties.

FIELD OF THE INVENTION

Aspects of the disclosed technology generally relate to systems and methods for managing a fantasy sports league, and more particularly, a fantasy sports league that can utilize actual performance data and a team value associated with a real sports team for determining a participant's fantasy roster of sports teams and a participant's points total throughout a league season.

BACKGROUND

A traditional or daily fantasy sports league can offer a contest for nearly any sport or league. However, traditional or daily fantasy sports leagues can require a significant amount of time, attention, and input. Participants competing in season-long or daily fantasy sports leagues generally need to manage their respective leagues on a daily basis (e.g., the sport that their league is in, the performance of multiple athletes, injury reports, upcoming matchups, scheduling changes, team player roster changes, and the like). Likewise, participants spend considerable amounts of time making several transactions during a league season (e.g., participate in trades, free agency, make adjustments to a team roster in account of injuries or poor player performance, etc.). By requiring such a large time commitment and effort, there exists a need for a fantasy sports model that caters to a market of consumers who are interested in simplicity, and in particular, those consumers who enjoy a fantasy sports league experience, but yet prefer a lessor time and attention commitment, for example, because they are too busy to engage in fantasy sports based on the increasing demands and responsibilities of everyday life.

SUMMARY

In an exemplary embodiment, a method of managing a fantasy sports league is provided. The method includes the steps of: receiving league setup data, wherein the league setup data comprises a real sports league with available real sports teams, a salary cap, a league start date, and a league end date; establishing an initial team value for each real sports team, wherein the initial team value is determined based on expected performance data associated with each real sports team; receiving team selections of the available real sports teams from a plurality of participants to generate a roster for each participant, wherein a summation of initial team values on each participant roster must be less than or equal to the salary cap; initiating a season on the league start date; generating an accumulated score for each participant during the season based on actual performance data of each real sports team currently on the roster for each participant, and finalizing the season on the league end date.

Features that are described and/or illustrated with respect to one embodiment may be used in the same way or in a similar way in one or more other embodiments and/or in combination with or instead of the features of the other embodiments The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention. It will be appreciated that illustrated element boundaries (e.g., boxes, groups of boxes, or other shapes) in the figures represent one embodiment of boundaries. In some embodiments, one element may be designed as multiple elements or that multiple elements may be designed as one element. In some embodiments, an element shown as an internal component of another element may be implemented as an external component and vice versa. Furthermore, elements may not be drawn to scale.

FIG. 3 is an illustration of an exemplary tier-based salary cap associated with managing a fantasy sports league according to an exemplary embodiment;

FIG. 9 is an illustration of exemplary expected win data corresponding to real sports teams in accordance with one aspect of the disclosed technology;

FIG. 10 is an illustration of an exemplary tier-based ranking of real sports teams with corresponding current team projected wins and current team values corresponding to each of the tiers.

DETAILED DESCRIPTION

Figure 1:
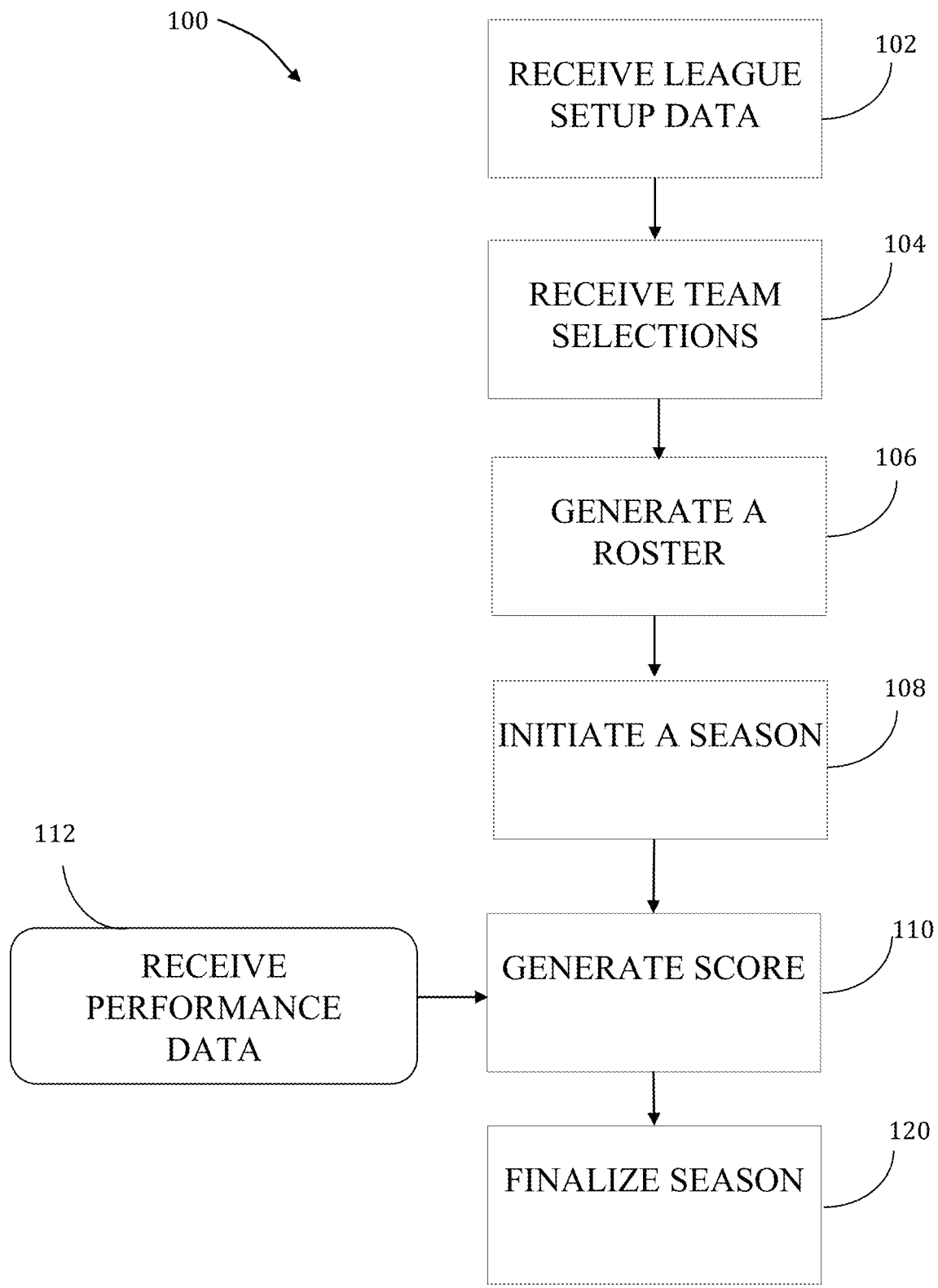
FIG. 1 is a flow chart depicting an exemplary method of managing a fantasy sports league.

The following includes definitions of exemplary terms that may be used throughout the disclosure. Both singular and plural forms of all terms fall within each meaning.

"Component," as used herein can be defined as a portion of hardware, a portion of software, or a combination thereof.

A portion of hardware can include at least a processor and a portion of memory, wherein the memory includes an instruction to execute. A component may be associated with a device.

"Logic," synonymous with "circuit" as used herein, includes but is not limited to hardware, firmware, software and/or combinations of each to perform a function(s) or an action(s). For example, based on a desired application or needs, logic may include a software-controlled microprocessor, discrete logic such as an application specific integrated circuit (ASIC), or other programmed logic device and/or controller. Logic may also be fully embodied as software.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software", as used herein, includes but is not limited to one or more computer readable and/or executable instructions that cause a computer, processor, logic, and/or other electronic device to perform functions, actions, and/or behave in a desired manner. The instructions may be embodied in various forms such as routines, algorithms, modules, or programs including separate applications or code from dynamically linked sources or libraries.

While the above exemplary definitions have been provided, it is Applicant's intention that the broadest reasonable interpretation consistent with this specification be used for these and other terms.

As discussed in more detail below, embodiments of the disclosed technology relate to systems and methods of managing a fantasy sports league (team-based league) comprised of teams selected from various sports leagues and conferences. In some embodiments, a team-based league can be formed for any sport for which team or player statistics are made available (e.g., baseball, basketball, football, hockey, soccer, etc.) or for nearly any real sports league (e.g., MLB, NBA, NFL, NHL, EPL, MLS, AAA baseball, etc.). In addition to actual sports leagues, the team-based league can be managed for any conferences, including, but not limited to, the SEC, Big Ten, Pac 12, AL Central, AL East, AL West, AFC North, NFC South, AFC West, and NFC East sports conferences. The team-based league may utilize all or a subset of real sports teams from a real sports league.

In exemplary embodiments, the team-based league can have as few as two participants (which may also be referred to as users of the invention). In some embodiments, the team-based league does not have a limit on the maximum number of participants. For instance, while traditional or daily sports leagues may limit the number of participants to the number of teams available in a particular real sports league or conference, the team-based (fantasy) league can engage or enlist participation from an unlimited number of participants irrespective of such limitations.

In some embodiments, the rules for the team-based league are established by a league captain or administrator. For example, the rules could relate to a salary cap, a list of available sports teams, an initial cost for each real sports team relative to the salary cap, the maximum number of participants, the beginning date of the team-based league, the length of a contest or team-based league season (e.g., weekly, monthly, half real league season, full real league season), a trade/exchange window or deadline, a team-based league (fantasy) team value (also referred to as "team value"), etc. Many other rules and configurations are possible to supplement those mentioned for any given application.

In exemplary embodiments, a draft or team selections can occur after the rules have been established by the league administrator. In some exemplary embodiments, the draft can occur simultaneously for each participant. In further exemplary embodiments, the league administrator can define a draft window for enabling participants to make draft selections at their own convenience. In this manner, each participant's draft process (e.g., selections) is mutually exclusive with respect to the draft process of other participants belonging to the same team-based league. In various embodiments, as discussed in more detail below, since the same real sports team can be acquired (rostered) by any number of participants, a sequential draft (with selected real sports teams becoming unavailable to other participants as they are selected) is not necessary.

In various embodiments, each participant can select a specified number of teams during the draft period/window such that all participants belonging to the same team-based league can own the same number of teams. In some embodiments, the team-based league can begin after all team selections have been received by the league administrator. In further exemplary embodiments, the actual beginning date of a contest or fantasy season can be established by the league administrator.

In various embodiments, the salary cap is used during the draft/selection process to limit the total projected value (e.g., via projected performance) of the real sports teams comprising each participant's roster. In some embodiments, the salary cap can also be maintained during the season to limit the current value (e.g., via projected remaining performance) of the real sports teams comprising each participant's roster, including during trades/exchanges. Various embodiments of salary caps are described in detail below.

In various embodiments, once the content or fantasy season begins, individual team outcomes or actual performance data can be tracked for each real sports team in the fantasy league. In such embodiments, individual team outcomes can also be aggregated for each participant. In further exemplary embodiments, the individual team outcomes can be used to determine the current team value associated with a real sports team on a participant's roster. For instance, the team value for a sports team on a participant's roster could increase during the season based on favorable, individual team outcomes (e.g., a team that is on a winning streak, performing better than expected, etc.), or decease for a team (e.g., based on losing, performing worse than expected, is beset with injuries, trades key players, etc.). In some embodiments, the individual team outcomes can include and/or be based on a number of various performance metrics, including, but not limited to, wins, losses, ties, a team record, points scored, offensive team statistics, defensive team statistics or any combination thereof, which can also be tracked at an individual team level.

With reference to FIG. 1, an exemplary method 100 of managing the team-based fantasy league is shown. The following flow charts and block diagrams illustrate exemplary configurations and methodologies associated with the team-based fantasy league. The exemplary methodology may be carried out in logic, software, hardware, or combinations thereof. In addition, although the procedures and methods are presented in an order, the blocks may be performed in different orders, including series and/or parallel. Further, additional steps or fewer steps may be used.

At step 102, league setup data is received for the team-based fantasy league. In various embodiments, the league setup data could include a league start date, a league end date, a list of available real sports teams, draft parameters, draft rules, a draft window, a draft deadline, a salary cap, scoring parameters, game rules (e.g., maximum number of participants, minimum and maximum number of real sports teams on a roster, point value determinations, team acquisition values, initial team values, trade parameters, trade windows, and the like). In some embodiments, the league administrator could define the league setup data to only include a list of available real sports teams from a real sports conference (e.g., the SEC of College Football, for instance). In some exemplary embodiments, the league setup data could include rules for locking team selections after the season begins. However, it is appreciated that other examples league setup data could be defined by the league administrator.

In some exemplary embodiments, an initial team value can be associated with each of the available real sports teams. In some embodiments, the initial team value could represent an acquisition value or cost of a team during a draft/selection process relative to a salary cap (e.g., the Chicago White Sox could have a team value of $3 relative to an overall salary cap of $20).

In various embodiments, the initial team value could be established based on expected performance data for a real sports team. In some embodiments, the expected performance data could represent an expected win percentage or number of expected wins for a real sports team, as discussed in greater detail below. However, in further embodiments, the expected performance data could be determined based on historical team performance including, but not limited to: a real team's prior record; points scored; points against; road wins; road losses; runs scored; runs against; win totals; loss totals; ties; offensive team statistics; defensive team statistics; etc.; or any combination thereof. Therefore, it is appreciated that the expected performance data could be based on any projected and/or historical team performance associated with a real sports team. In some embodiments, the expected performance data could also be associated with projections for a sports team (e.g., based on analytics from a sports website or sports almanac, etc.).

In exemplary embodiments, each participant of the team-based league is provided with a salary cap that defines the maximum expenditure or salary cap funds each participant has available to make team selections. In such exemplary embodiments, a summation of the initial team values of the selected real sports teams should be less than or equal to the salary cap. With additional reference to FIG. 3, an illustration of an exemplary tier-based salary cap method is shown. In the exemplary embodiment, each real sports team is arranged into tiers (A-E) corresponding to the initial team values (see, e.g., team values 306, 307, 308, 309, and 310). As shown in the exemplary embodiment, the salary cap is determined based on the summation of the initial team values 306, 307, 308, 309, and 310, shown as total salary cap value 312. In some exemplary embodiments, the number of tiers is equal to the number of real sports teams that can be selected by each participant. For example, in one embodiment, if the league setup data requires that each participant select 8 teams, the number of tiers could be equal to 8, and the salary cap could be equal to 36 (8+7+6+5+4+3+2+1=36). Therefore, the summation of the initial team values on each participant's roster would have to be equal to or less than 36.

Figure 4:
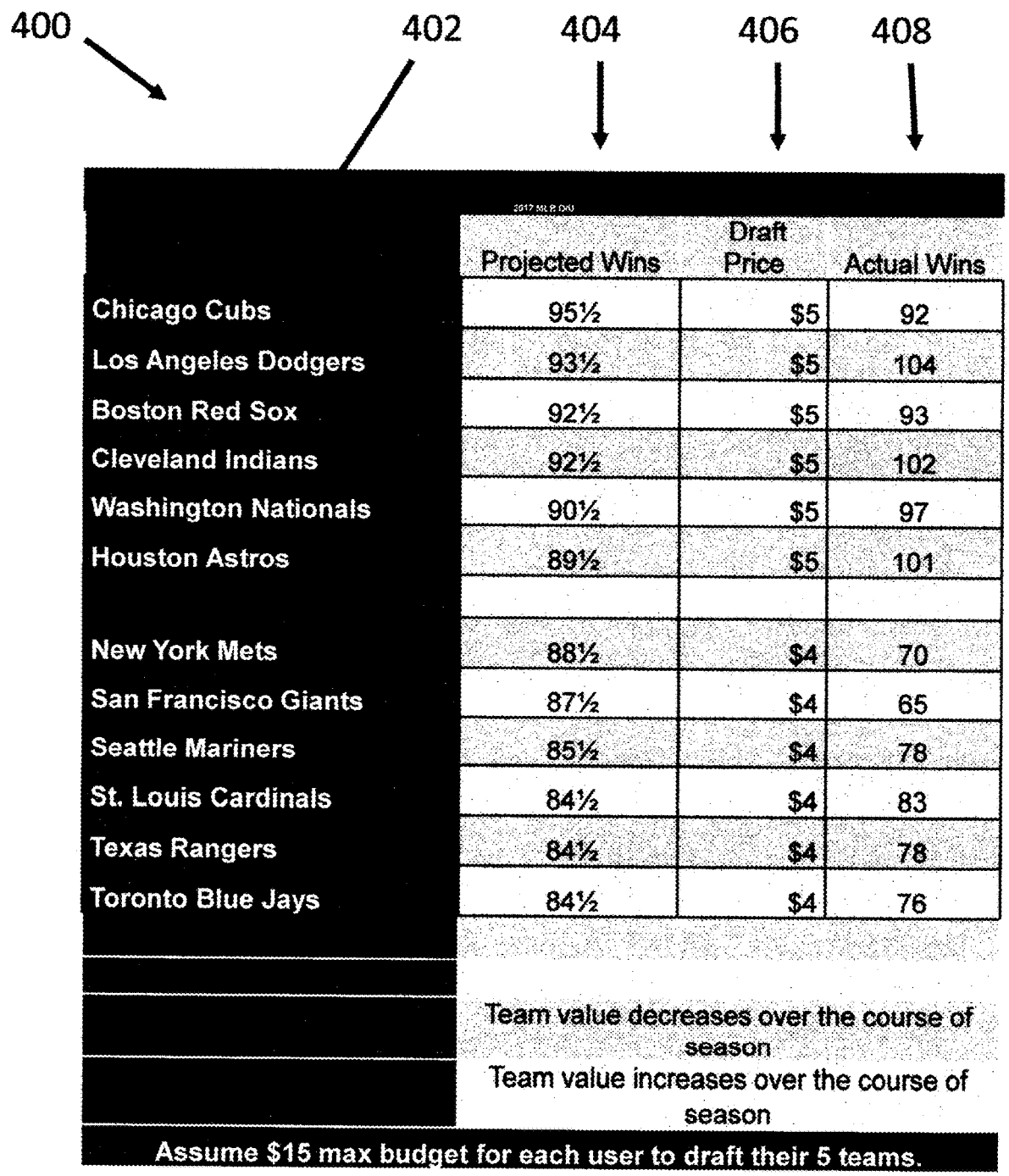
FIG. 4 is another illustration of an exemplary tier-based salary cap associated with managing a fantasy sports league according to an exemplary embodiment.

Referring to FIG. 4, another illustration of an exemplary tier-based salary cap method is shown. In the exemplary embodiment, each tier is established relative to the expected performance data for each real sports team, and in particular, a minimum number of projected wins and a maximum number of projected wins. However, in some exemplary embodiments, the salary cap can be determined using an exact value method. In one such embodiment, the salary cap is determined by: (a) averaging a series of consecutive numbers from 1 to n, wherein n is equal to the maximum number of teams in the real sports league; (b) multiplying the recorded average of step (a) by the number of teams in each participant roster; and rounding up the result of step (b) to the nearest whole number.

For example, in a 30-team fantasy league, where each participant is required to draft 5 teams, the salary cap can be calculated by taking the average value of the consecutive numbers from 1 to 30 teams and multiplying the result by 5. For instance, the average value of numbers 1, 2, 3, 4, through 30 is 15.5. Multiplying this by 5 provides a result of 77.5. Rounding this number up to the nearest whole number would result in the salary cap being equal to 78. In such exemplary embodiments, each participant can spend this amount of funds during a draft for selecting teams.

Alternatively, and in some embodiments, a participant could reserve a portion of the salary cap for in-season trading or exchanges as described in detail below.

Referring back to FIG. 1, each participant's team selections are then made in view of the salary cap. In particular, at step 104 (FIG. 1), team selections are received during a draft/selection process. More specifically, each participant can select teams from those on the list of available real sports teams associated with the team-based league. In some embodiments, each participant can make team selections during a draft window (e.g., during a one-week period preceding the fantasy league start date). In this manner, participants can make team selections at their own convenience. For instance, if a first participant chooses to build a roster that includes the Cleveland Browns, Chicago Bears, and the New York Jets on a Friday night, a second participant could select a roster comprising the Los Angeles Rams, Cleveland Browns, and the Miami Dolphins on a Saturday night. In this respect, the team-based fantasy league is a versatile model that caters to each participant's availability, schedule, and time constraints. As demonstrated by the exemplary embodiment, the team-based league can engage an unlimited number of participants who can submit or make team selections for the same real sports team at the same or different times.

Then, at step 106, a roster is generated for each participant of the team-based league based on the team selections received at step 104. In additional embodiments, each participant's roster can automatically be generated, as discussed in detail below.

Next, at step 108, a league season is initiated and runs concurrently with all or a portion of an actual league season associated with the real sports league. For instance, the league administrator could define league setup data that calls for a month long season or contest. In other embodiments, the league season could take place over half of a regular season. In some embodiments, a league season could take place over specified weeks in the actual league season, pause for certain weeks, and then resume at a later date. Thus, it will be appreciated that any length or combination of in-season periods can be defined in the league setup data.

Then, at step 110, as the fantasy season progresses, an accumulated score is generated for each participant based on actual performance data 112 associated with each real sports team on each participant's roster. In some embodiments, actual performance data 112 could include a plurality of performance inputs such as a team's record, points scored, wins, losses, ties, post season wins, post season statistics, offensive team statistics, defensive team statistics, etc. or any combination thereof. In such exemplary embodiments, the plurality of performance inputs associated with the real sports teams owned by each participant are aggregated into scores for each participant. In such exemplary embodiments, the scoring can be done automatically and calculated daily, weekly, monthly, during a half season, or at the conclusion of a season, or during any combination of the above. The performance data can be received from a variety of sources, including manual entry (e.g., by an administrator) and automatic feeds, for example, from league data sources, including on-line sources. In some embodiments, the received performance data may be aggregated into a current or projected measure of performance. As discussed in detail below for other embodiments, this performance data may also be used to determine current team values.

Then at step 120, the fantasy season is terminated on the league end data. In some embodiments, the accumulated score is generated for each participant and a winner is selected. In some exemplary embodiments, the combined points earned for each participant is totaled at the end of the season for determining a winner.

Figure 2:
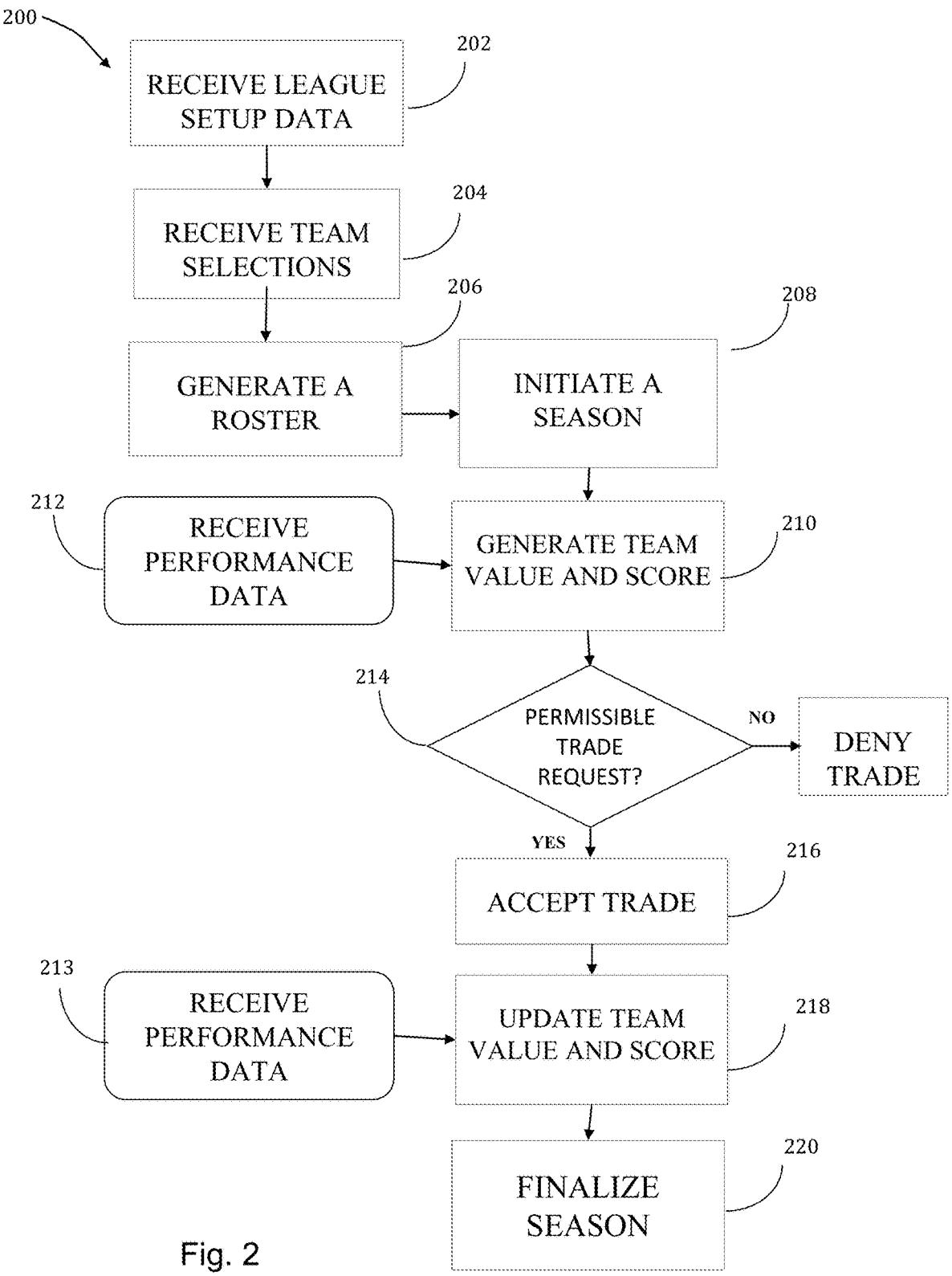
FIG. 2 is a flow chart depicting another exemplary method of managing a fantasy sports league.

Referring to FIG. 2, another exemplary method 200 of managing the team-based league is shown. As can be seen in FIG. 2, steps 202, 204, 206, 208, and 220 are the same as those depicted by steps 102, 104, 106, 108, and 120 of FIG. 1, respectively. Thus, a description of the same steps is therefore omitted to avoid redundancy.

Referring to the exemplary embodiment of FIG. 2, a current team value can be determined corresponding to each real sports team belonging to each participant's roster. In some embodiments, the current team value can represent a responsive indicator of how each real sports team is performing based on the actual performance data discussed above. In some embodiments, the team value can represent the initial value when performing a draft. Yet in other embodiments, the current team value can be used as a metric for determining whether one of the available real sports team can be added to each participant's roster (e.g., via a trade/exchange), as explained in greater detail below.

Referring to the embodiment of FIG. 2, the current team value 210 can be determined based on the several examples of actual performance data 212 described herein. For instance, and in a baseball context, the current team value of each real sports team could be associated with the number of total wins, losses, road wins, total runs scored, total runs allowed, and the like. Therefore, it is appreciated that many examples of actual performance data associated with various sports leagues could be used to determine the current team value.

In some embodiments, the current team value can be determined based on an expected win percentage. In some embodiments, the expected win percentage can be determined via application of a Pythagorean expectation formula to the actual performance data described above (see the following equation 1):

$$\text{Expected Final Win Percentage} = \frac{(\text{runs } scored^2)}{(\text{runs } scored^2 + \text{runs } allowed^2)s} \quad \text{Equation 1}$$

Thus, according to such embodiments, the expected win percentage will be a decimal value. In further exemplary embodiments, the expected win percentage can be determined at various intervals (e.g., every day, week, month, half-season point) for updating the current team values (see 218 of FIG. 2). Thus, in in some exemplary embodiments, each real sports team defined in the league setup data can be ranked prior to the start of the fantasy season according to their expected wins percentage. As previously described, in various embodiments, the real sports teams can be sorted into tiers. However, in other embodiments, each of the real sports teams can be ranked individually during the season using a team's expected win percentage. The expected win percentage can also be used to determine each real sports team's tier placement prior to and/or during the season. In such exemplary embodiments, the tier placement would define each sports team's current team value (e.g., Tier 1=$5, Tier 2=$4, etc.).

In some embodiments, the expected win percentage can be calculated at any time to provide an expected win total for each real sports team during the course of the fantasy season. Thus, in some embodiments, if an expected final win percentage is calculated to be different from an original expected win percentage, a particular real sports team may move up or down within the tier structure as the real sports team's associated value increase or decreases. In some embodiments, if the expected final win percentage is calculated to be different from the original percentage, a current team value can be updated for either increasing the current team value, maintaining the current team value at its current value, or deceasing the current team value.

In some embodiments, the expected win percentage could also be used directly to determine each team's initial team value, current team value, the accumulated score, or any other metric associated with each participant's roster or league standing at any point during the season. In some exemplary embodiments, each available real sports teams associated with the league setup data can be ranked or placed into the tiers prior to the start of the season according to their expected win percentage (and value).

Still referring to the embodiment of FIG. 2, the current team values can be used to determine whether a trade or a participant exchange request is permissible at step 214, based on the league setup data. In some embodiments, a trade/exchange request rule will disallow the participants from exchanging a first real sports team (e.g., on the participant's roster) for another real sports team (of the available real sports teams) if the current team value of the second sports team is higher than the current team value of the first real sports team. In this manner, the current team value can be determinative for accepting or disallowing a trade/exchange request.

In some embodiments, unused funds related to each participant's salary cap can be utilized to enable exchange requests where the acquired team has a current team value higher than the released team's current team value. For example, if a participant has a salary cap of $30, and that participant only spent $25 during the draft (i.e., $25 of initial team value associated with the real sports teams on the participant's roster), then $5 (unused funds) can be supplemented to the participant's trade/exchange request. In such embodiments, the current team value of the first team on the participant's roster can be added to the unused funds for determining whether a trade/exchange request for the second sports team is permissible under the trade/exchange request rule described above.

In yet other embodiments, the real sports team that a participant would like to release as part of an exchange may have a current team value lower (or higher) than its initial team value, which was used against the salary cap during the selection step 204. The league setup data can specify rules that determine whether the team that the participant would like to acquire must have a current value equal to or less than the current value or the initial value of the real sports team that a participant would like to release. The difference between the initial team value and the current team value may be substantial if the team is overperforming or underperforming. For example, in one application of exemplary exchange rules, if a real sports team is overperforming (i.e., current team value is greater than initial team value), a participant's current roster value may be over the salary cap. Depending on the exchange rules (e.g., equal/lesser value or relative to the salary cap), the participant may or may not be able to acquire a team of equal or lesser value.

A trade request rule also provides several experience-based advantages. For example, each participant's accumulated score attributed to the real sports teams on the roster at a point in the season can be leveraged for determining an ultimate winner when generating the accumulated score at the end of the season 220. For example, if a participant's roster includes the Chicago Cubs who begin a season with a favorable record (20 wins and 10 losses), the participant's points total at that particular point in the season will include points attributed to the Cubs record (20 wins and 10 losses). If the participant then decides to trade the Cubs for another team (e.g., the Indians) prior to the next game for each ball club ($31^{st}$ game), then the participant's end of season points total will comprise points associated with the 20 wins for the Cubs (for the first 30 games), and whatever points are attributed to the Indians beyond the $30^{th}$ game. Thus, if the Indians then have a favorable record moving forward (20 wins, 10 losses), then participant's points total will be determined based on the 20 wins associated with the Cubs throughout the first 30 games, and the 20 wins associated with Indians based on the next 30 games. In this manner, the participant's points total would not be impaired by the Cubs' record, if, for example, the Cubs lost a total of 20 games during the span of games 31-60. Thus, in some embodiments, the timing of making a trade can be critical to a participant's overall points total and success.

As can be appreciated, the use of current team values (e.g., that are updated during the season), exchange rules, and/or accumulated point scoring can incentivize a variety of team management strategies (and fantasy league configurations).

In some embodiments, a trade/exchange window can be defined in the league setup data. For example, a trade exchange window can be defined to take place over a certain period of the league season (e.g., league weeks, or games for a particular sports league season). In other embodiments, a trade window can be defined to take place at predetermined points in time throughout the season (e.g., the Monday of every week). Further exemplary embodiments may also limit the number of exchange requests to a determined number during an exchange session, the fantasy season, or both.

As discussed above, a current team value can represent a responsive indicator of how each real sports team is performing based on actual performance data. As shown in the embodiment of FIG. 3, the current team value and participant scoring can be updated during the season by receiving performance data 213 at a later point in time (e.g., can be updated and refreshed daily, weekly, monthly, half-season, or at any predetermined period of time as established by the league set up data).

One of ordinary skill in the art will understand that the disclosed equations are exemplary and that variations in the scoring methods, league organizations, and other characteristics that are particular to each sport may result in variations in the calculations required to obtain the various parameters calculated. For example, in certain leagues, real sports teams receive a ranking score based on wins/losses/ties. In another example, in certain real sports leagues, real sports teams receive points when a game does not end in a win during ordinary time and game goes into an extend time period (overtime).

Figure 8:
FIG. 8 is an illustration of exemplary actual performance data corresponding to real sports teams in accordance with one aspect of the disclosed technology.

As illustrated in the exemplary embodiment 800 of FIG. 8, the expected wins calculation results in a score for each real sports team. As shown in the exemplary embodiment 900 of FIG. 9, the real sports teams can also be ranked according to expected wins. Referring to the exemplary embodiment 1000 of FIG. 10, which shows ranked real sports teams separated into tiers A-H, with corresponding current team projected wins and current team values ("exchange value") corresponding to each of the tiers. The tiers are associated with projected win ranges that then relate to an associated current team value, where a higher expected win total corresponds to a higher current team value, as shown by the tiers. In some exemplary embodiments, the teams will be re-ranked according to their actual performance data during the season, for example, at various intervals. In additional exemplary embodiments, the current team values will also be adjusted in accordance with their actual performance during the season. This re-ranking provides an opportunity for participants to make changes to their team rosters. In some embodiments, the current team values include post-season outcomes (e.g., wins, playoff record, playoff points scored, playoff runs scored, etc.).

As discussed above, conventional fantasy sports leagues are constrained by a maximum participant total per league with additional limitations on transactions. For example, if a professional/collegiate sport league only has 30 teams total then, in theory, the maximum participants per league is fixed at 30 participants. In practice, most leagues will be set at 5-7 participants drafting players to form anywhere from 4-6 teams each. In an exemplary embodiment, the team-based fantasy league solves the problem of limited numbers of potential participants by expanding the potential participant base to an unlimited number. The team-based method also helps to alleviates many issues caused by a live online/offline draft where participants can submit their picks before a defined deadline as opposed to finding an open spot on everyone's schedule to draft. In an exemplary embodiment, the team-based method alleviates those limitations on trades resulting from conventional methods of fantasy sports leagues. In these fantasy sports league methods, if all available teams are used, the only way a participant can make a change is to find a willing partner. In the team-based method, each participant only needs to make changes as permitted by league setup data without having to find a trading partner.

In some exemplary embodiments, the current team values will be adjusted to allow all participants to add or drop teams within their adjusted current team values. In such exemplary embodiments, there are constraints comprising a timed deadline for when new team outcomes begin to be considered. Such a deadline would avoid a circumstance such as a participant dropping a team at 6:00 am on a Monday for a new team and expecting to receive a win for a team that played Monday evening at 7:00 pm.

Figure 5:
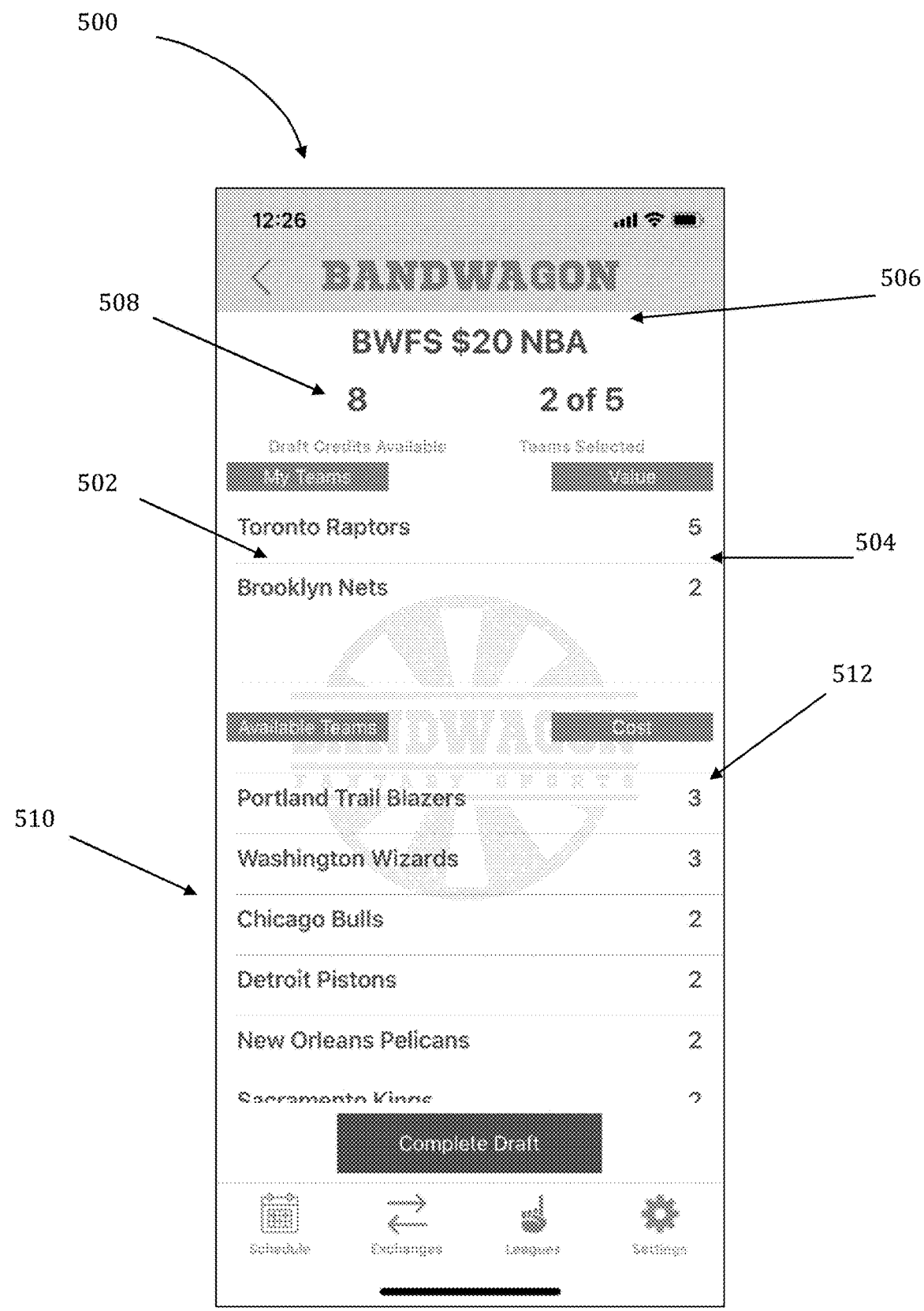
FIG. 5 is a representation of an exemplary user interface used in displaying information to a participant of a fantasy sports league.
Figure 6:
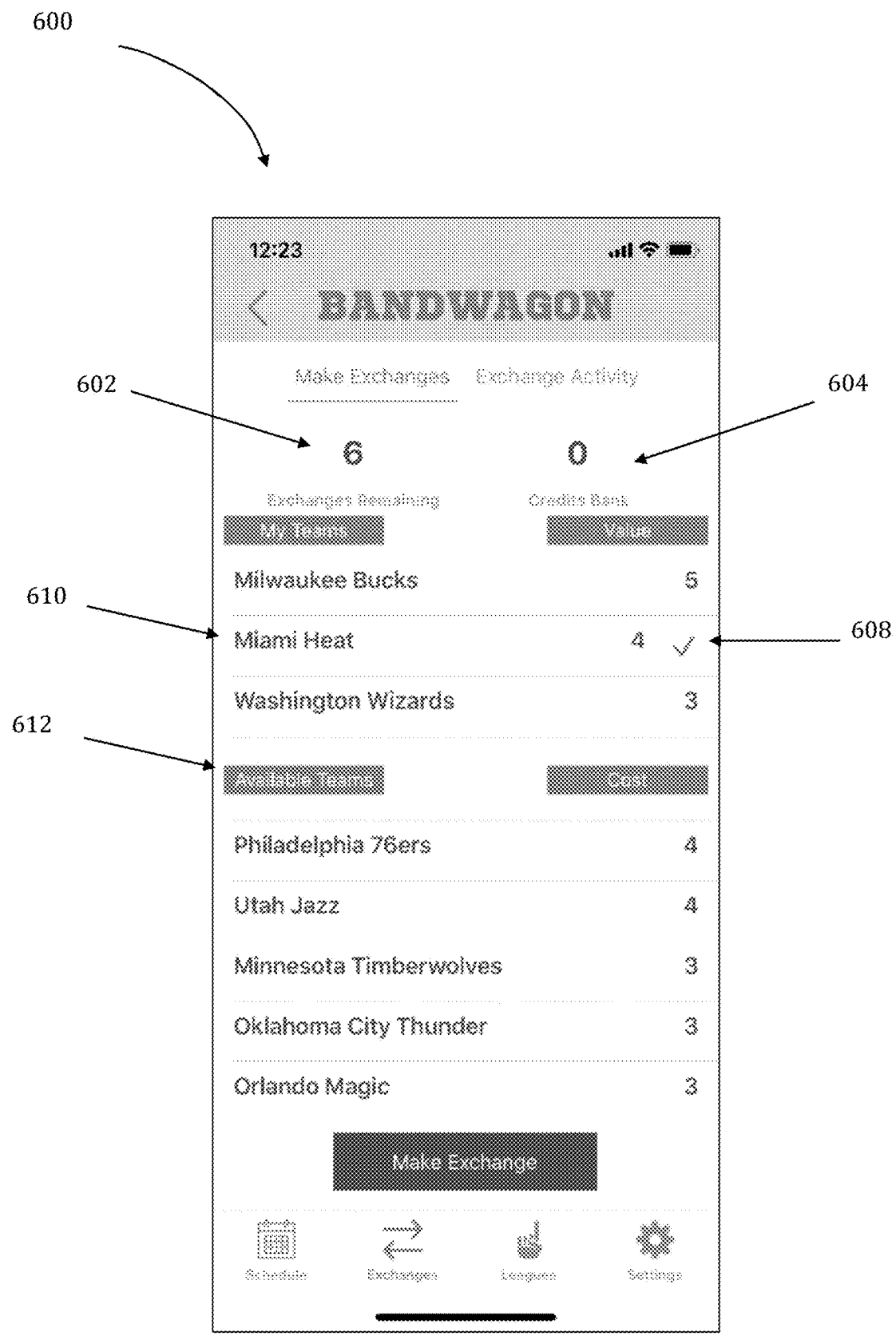
FIG. 6 is another representation of an exemplary user interface used in displaying information to a participant of a fantasy sports league.

Referring to FIG. 5, an exemplary embodiment of a user interface according to an exemplary embodiment is shown. In the exemplary embodiment, a user interface can provide a snapshot of the teams 502 on each participant's roster and each team's initial or current team value 504 at any given time throughout the season. However, additional information can also be displayed in the exemplary user interface of FIG. 5, such as, for example, the sports league 506, the unused salary cap funds 508, available sports teams 510 for team selection or exchange purposes, and their associated initial or current team values 512. FIG. 6 is an exemplary embodiment of another user interface that is used to display trade/exchange information. For instance, the exemplary user interface of FIG. 6 can display the number of available exchanges that a participant can engage in during a team-based league season in accordance with the applicable exchange rules. The user interface can also display the initial or current team value 608 of a team 610 that is being traded out of a roster for another sports team that is in the list of available sports teams 612.

Figure 7:
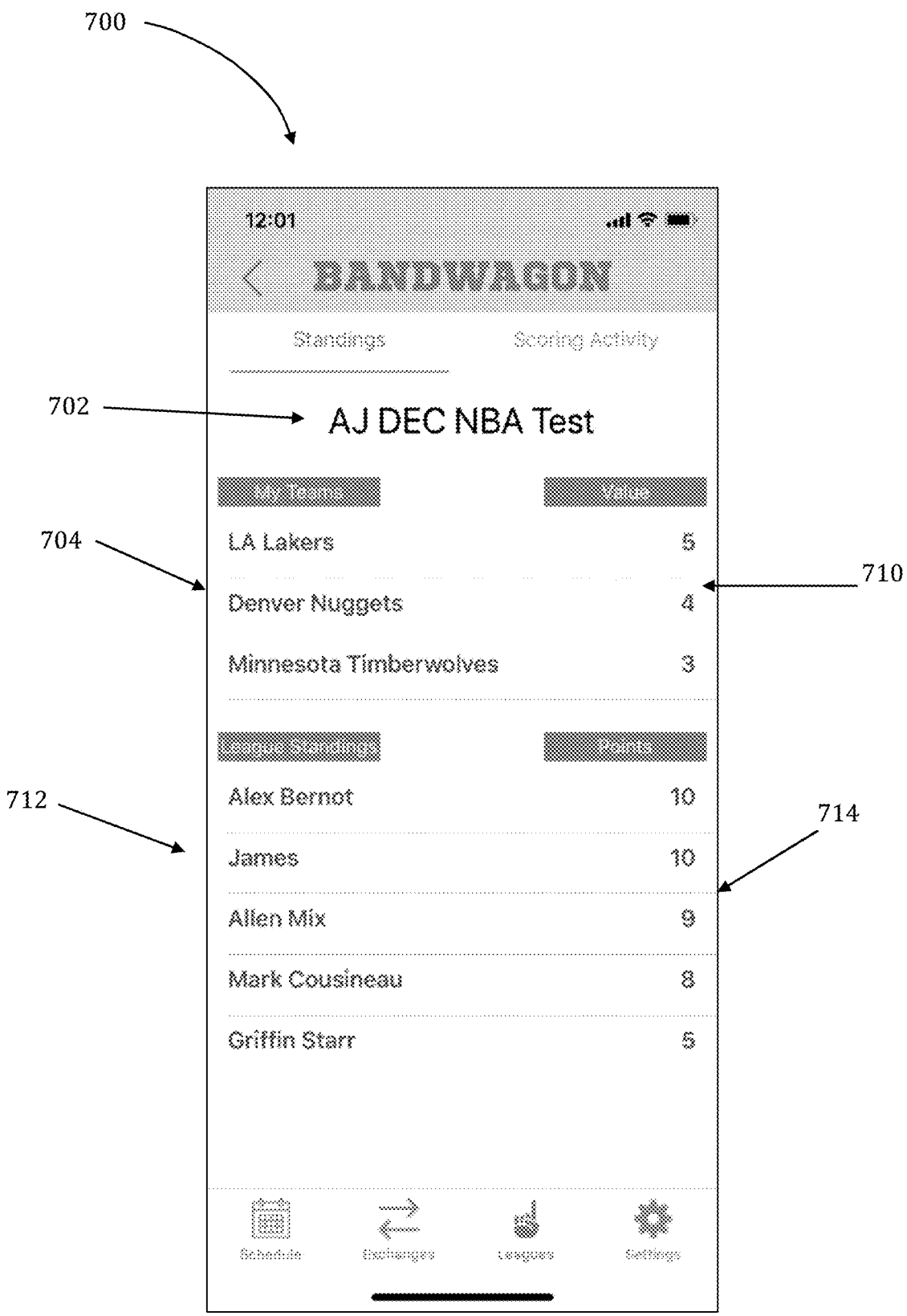
FIG. 7 is yet another representation of an exemplary user interface used in displaying information to a participant of a fantasy sports league.

Referring to FIG. 7, and in some exemplary embodiments, participants can track their status relative to other participants. As shown in FIG. 7, the league standing interface 700 can display the current league 702, each participant's roster of teams 704, and a listing of all participants 712 that belong to the team-based league along with their accumulated score or rankings.

Figure 11:
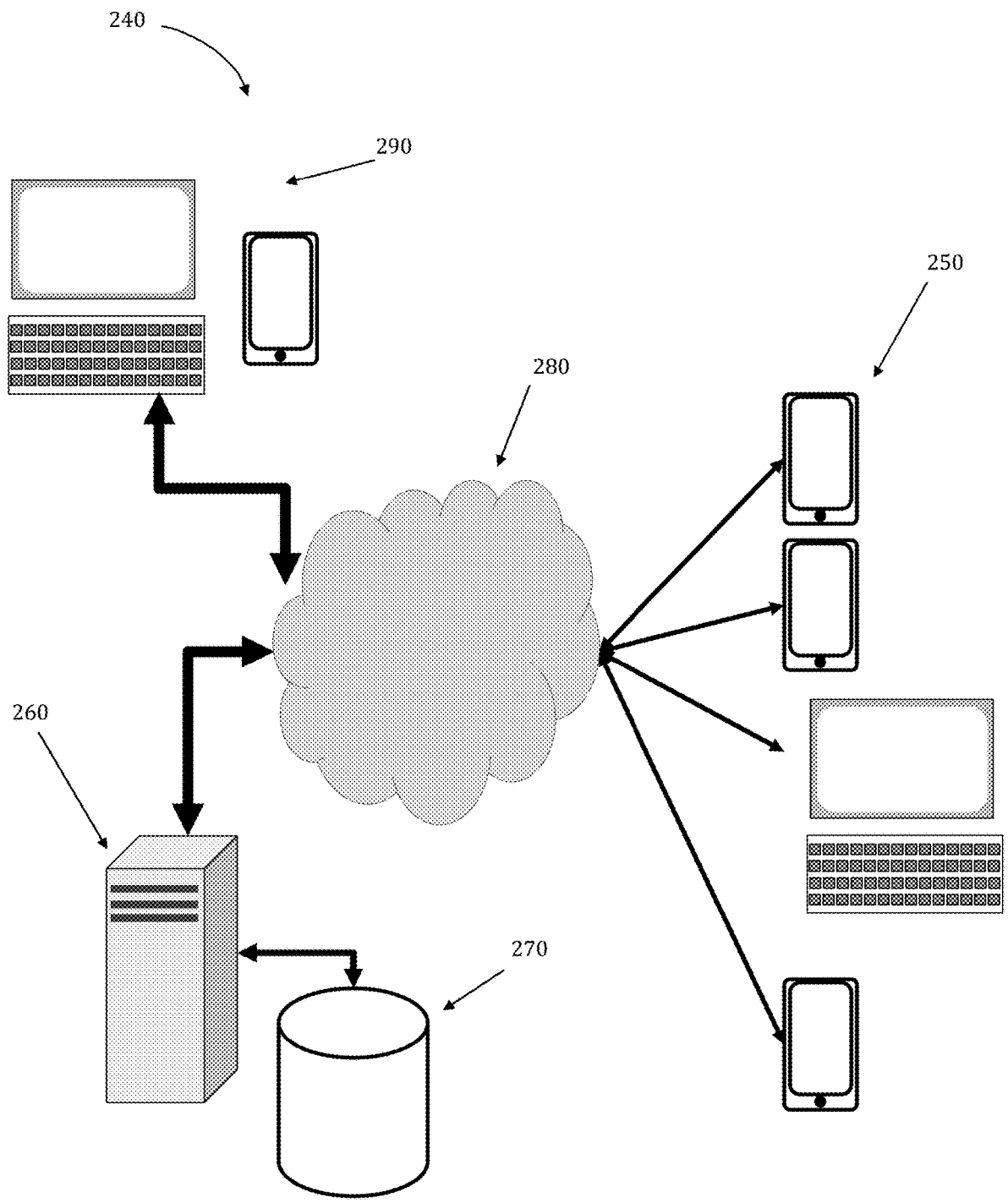
FIG. 11 illustrates a block diagram of an exemplary computerized fantasy sports league management system with a plurality of participant devices according to an exemplary embodiment.

FIG. 11 illustrates a block diagram of an exemplary computerized fantasy sports league management system 240. As shown in the exemplary embodiment, an administrator device 290 (e.g., smart phone, laptop, desktop, etc.) is in communication with a wide area network 280 such as, for example, the Internet. In various embodiments, the administrator device 290 may also be in communication with a plurality of participant remote devices 250 (e.g., smart phone, laptop, desktop, etc.) and/or a server 260 via the wide area network 280, and the server 260 may be in communication with a database 270. In some embodiments, the administrator device 290 may be in direct communication with the database 270 (without the server 260). Each of the plurality of participant remote devices 250 is also in communication with the network 280 and can communicate with devices 290, 260, 270, for example, via the Internet 280.

In some exemplary embodiments, the league administrator or captain can interact with the administrator device 290 for providing league setup data to one or more host devices (e.g., one or more administrator devices 290, servers 260, and/or databases 270, etc.) for maintaining the software, logic, components, settings (league setup data), etc. necessary for storing and executing the methods described above. The host device(s) include processors and memory to store and execute the software, logic, components, settings (league setup data), etc. In this manner, the league administrator can make available the league setup data to each of the plurality of participant remote devices 250 prior to and during the season.

In exemplary embodiments, the system is configured to receive selections and requests from the plurality of remote devices 250, and send the corresponding requests to the one or more host devices for processing. In various exemplary embodiments, the host can implement: the salary cap; the initial team values; the current team values; expected wins percentages; etc. as described herein. The host can also process exchange requests; generate accumulated scores; initiate the fantasy season; and/or finalize the fantasy season.

In some exemplary embodiments, the plurality of remote devices 250 can also send such requests directly to the host, such as, for example, exchange requests and team selections. In some exemplary embodiments, the host includes logic to receive the plurality of performance metrics during the league season for determining an expected win percentage using any of the methods or equations described herein.

In some exemplary embodiments, the league setup data could be automatically sent to the plurality of participant remote devices 250 based on instructions (e.g., software) developed for the team-based league. In some exemplary embodiments, the instructions could be situated in the database 270 that is developed relative to a particular type of sport for a specific calendar year.

In some exemplary embodiments, each participant remote device 250 may communicate with the host via a web page, an app, or other user interface (e.g., FIGS. 5-7) that is maintained by the host for receiving and sending team selections and exchange requests to the host. Exemplary embodiments may also have various other configurations of the illustrated components, for example, without limitation, an exemplary embodiment may comprise a plurality of databases. In other exemplary embodiments, the administrator interface device 290, remote devices 250, and/or any other device may be locally connected, that is, it may be connected to one or more other devices with another network or directly, rather than the Internet.

In exemplary embodiments, the host can include logic for providing a fantasy sports league application to the plurality of remote devices 250. In some exemplary embodiments, the fantasy sports league application can include a user interface (e.g., FIGS. 5-7) for displaying the participant's roster; initial team values; current team values; estimated wins percentages; estimated wins; fantasy league statistics; expected performance data; actual performance data; the salary cap; the unused salary cap; participant standings; accumulated scores; or any one of the plurality of performance inputs described herein, etc. In one embodiment, it is appreciated that the server 260 could include such logic for providing a fantasy sports league application to the plurality of remote devices 250.

Although the disclosed technology has been shown and described with respect to a certain aspect, embodiment or embodiments, it is obvious that equivalent alterations and modifications will occur to others skilled in the art upon the reading and understanding of this specification and the annexed drawings. In particular regard to the various functions performed by the above described elements (components, assemblies, devices, members, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary aspect, embodiment or embodiments of the disclosed technology. In addition, while a particular feature of the disclosed technology may have been described above with respect to only one or more of several illustrated aspects or embodiments, such feature may be combined with one or more other features of the other embodiments, as may be desired and advantageous for any given or particular application.

While the embodiments discussed herein have been related to the systems and methods discussed above, these embodiments are intended to be exemplary and are not intended to limit the applicability of these embodiments to only those discussions set forth herein. While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

The invention claimed is:

1. A method of managing a fantasy sports league having real sports teams and dynamics salary cap-based trading, the method comprising:
   receiving league setup data, wherein the league setup data comprises a real sports league with available real sports teams, an initial salary cap, a league start date, and a league end date;
   establishing an initial tea, value for each real sports team, wherein the initial team value is determined based on expected performance data associated with each real sports team and wherein the initial team value for each real sports team is known to each participant;
   receiving from a plurality of participants team selections of the available real sports teams, where different participants can own the same teams on the same day, and generating a roster for each participant;
   calculating a summation of initial team values on each participant roster that must be less than or equal to the initial salary cap;
   initiating a season on the league start date;
   determining a current team value during the season based on actual performance data, wherein the actual performance data is based on a plurality of performance inputs including at least wins, losses, and an expected win percentage;
   permitting subsequent team trades based on a dynamic salary cap for each participant that can be different from the initial salary cap and different for different participants;
   generating an accumulated score for each participant during the season based on actual performance data of each real sports teams currently on the roster for each participant; and
   finalizing the season on the league end date.

2. The method of claim 1, further comprising:
   exchanging a first real sports team on the roster of one of the participants for a second real sports team of the available real sports teams in response to a participant exchange request if the current team value of the second real sports team is less than or equal to the current team value of the first real sports team;
   receiving back the difference in the salary cap between the first real sports teams and the second real sports team if the second real sports team has a lesser value than the first real sports team;
   wherein the current team values of the first real sports team and the second real sports team are based on actual performance data associated with each real sports team during the season.

3. The method of claim 1, further comprising:
   exchanging a first real sports team on the roster of one of the participants for a second real sports team of the available real sports teams in response to a participant exchange request if a summation of current team values on the participant roster after the exchange is less than or equal to the current salary cap for the one participant;
   receiving back the difference in the salary cap between the first real sports teams and the second real sports team if the second real sports team has a lesser value than the first real sports team;
   wherein the current team values of the real sports teams on the participant roster are based on actual performance data associated with each real sports team during the season.

4. The method of claim 1, wherein the expected win percentage is calculated using a Pythagorean expectation formula.

5. The method of claim 1, wherein the plurality of performance inputs additionally include at least one of ties; overtime wins; a current winning percentage; or post season wins.

6. The method of claim 1, wherein each real sports team is associated with a tier based on the expected performance data associated with each real sports team, and wherein each tier defines the initial team value for each real sports team.

7. The method of claim 6, wherein the summation of the initial team values associated with each tier determines the initial salary cap, and wherein the summation of the initial team values on the participant roster must be less than or equal to the initial salary cap.

8. The method of claim 1, wherein each real sports team is associated with a tier based on actual performance data associated with each real sports team during the season, and wherein each tier defines the current team value for each real sports team.

9. The method of claim 1, wherein the initial salary cap is determined by: (a) multiplying a first factor by a second factor, wherein the first factor is determined by averaging a series of consecutive numbers from 1 to n, wherein n is equal to the maximum number of teams in the real sports league, and wherein the second factor is equal to the number of teams in each participant roster; and (b) rounding up the result of (a) to the nearest whole number.

10. The method of claim 1, wherein the plurality pf performance inputs additionally include ties; overtime wins; a current winning percentage; and postseason wins.

11. A system for managing a fantasy sports league having real sports teams and dynamic salary cap-based trading, the system comprising:
    an administrator device comprising a processor and a memory, wherein the administrator device implements logic that configures the system to:
    receive league setup data, wherein the league setup data comprises a real sports league with available real sports teams, an in initial salary cap, a league start date, and a league end date;
    establish an initial team value for each real sports team, wherein the initial team value is determined based on expected performance data associated with each real sports team and wherein the initial team value for each real sports team is known to each participant;

receive from a plurality of participants team selections of the available real sports teams where different participants can own the same team on the same day from a plurality of remotes devices, wherein each remote device is associated with a participant;

generate a roster for each participant, and calculating a summation of initial team values on each roster that must be less than or equal to the initial salary cap;

initiate a season on the league start date;

determine a current team value during the season based on actual performance data, wherein the actual performance data is based on a plurality of performance inputs including at least wins, losses, and an expected win percentage;

permit subsequent team trades based on a dynamic salary cap for each participant that can be different from the initial salary cap and different for different participants;

generate an accumulated score for each participant during the season based on actual performance data of each real sports team currently on the roster for each participant; and finalize the season on the league end date.

12. The system of claim 11, wherein the administrator device further comprises logic to:
receive participant exchange requests from remote devices and exchange a first real sports team on the roster of one of the participants for a second real sports team of the available real sports teams in response to the participant exchange request if the current team value of the second real sports team is less than or equal to the current team value of the first real sports team;
receive back the difference in the salary cap between the first real sports teams and the second real sports team if the second real sports team has a lesser value than the first real sports team;
wherein the current team values of the first real sports team and the second real sports team are based on actual performance data associated with each real sports team during the season.

13. The system of claim 11, wherein the administrator device further comprises logic to:
receive participant exchange requests from remote devices, and exchange a first real sports team on the roster of one of the participants for a second real sports team of the available real sports teams in response to the participant exchange request if a summation of current team values on the participant roster after the exchange is less than or equal to the current salary cap for the one participant;
receiving back the difference in the salary cap between the first real sports teams and the second real sports team if the second real sports team has a lesser value than the first real sports team;
wherein the current team values of the real sports teams on the participant roster are based on actual performance data associated with each real sports team during the season.

14. The system of claim 11, wherein the expected win percentage is calculated using a Pythagorean expectation formula.

15. The system of claim 11, wherein the plurality of performance inputs additionally include at least one of ties;

overtime wins; a current winning percentage; postseason wins; a championship win, historical wins, or season projections.

16. The system of claim 11, wherein each real sports team is associated with a tier based on the expected performance data associated with each real sports team, and wherein each tier defines the initial team value for each real sports team.

17. The system of claim 16, wherein the summation of the initial team values associated with each tier determines the initial salary cap, and wherein the summation of the initial team values on the participant roster must be less than or equal to the initial salary cap.

18. The system of claim 11, wherein each real sports team is associated with a tier based on actual performance data associated with each real sports team during the season, and wherein each tier defines the current team value for each real sports team.

19. The system of claim 11, wherein the initial salary cap is determined by: (a) multiplying a first factor by a second factor, wherein the first factor is determined by averaging a series of consecutive numbers from 1 to n, wherein n is equal to the maximum number of teams in the real sports league, and wherein the second factor is equal to the number of teams in each participant roster; and (b) rounding up the result of (a) to the nearest whole number.

20. A method of managing a fantasy sports league having real sports teams and dynamic salary cap-based trading, the method comprising:
receiving league setup data from an administrator, wherein the league setup data comprises a real sports league with available real sports teams, an initial salary cap, a league start date, and a league end date;
establishing an initial team value for each real sports team, wherein the initial team value is determined based on expected performance data associated with each real sports team and wherein the initial team value for each real sports teams is known to each participant;
providing a fantasy sports league application to a plurality of participants, wherein the fantasy sports league application comprises logic that configures one or more participants devices for:
displaying the available real sports teams and the initial salary cap;
sending participant team selections of the available real sports teams;
receiving from the plurality of participants teams selections of the available real sports teams where different participants can own the same teams on the same day and generating a different roster for each participant;
calculating a summation of initial team values on each participant roster that must be less than or equal to the initial salary cap;
initiating a season on the league start date;
determining a current team value during the season based on actual performance data, wherein the actual performance data is based on a plurality of performance inputs including at least wins, losses, and an expected win percentage;
permitting subsequent team trades based on a dynamic salary cap for each participant that can be different from the initial salary cap and different for different participants;
generating an accumulated score for each participant during the season based on actual performance data of each real sports team currently on the roster for each participant; and
finalizing the season on the league end date.

* * * * *